Feb. 1, 1938.    J. O. BLACK    2,106,883
BATTERY INSTALLATION FOR MOTOR VEHICLES
Filed April 8, 1936
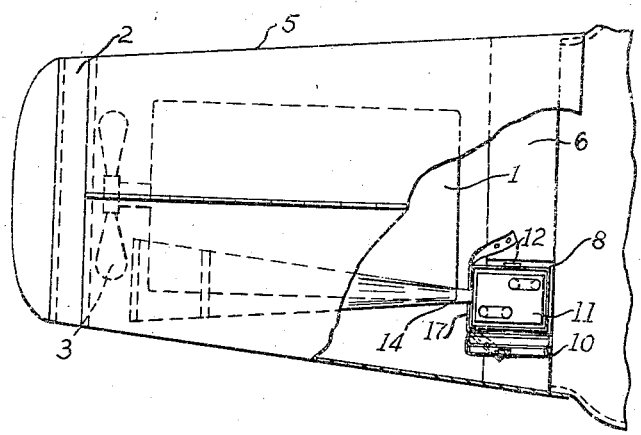
Fig. 2
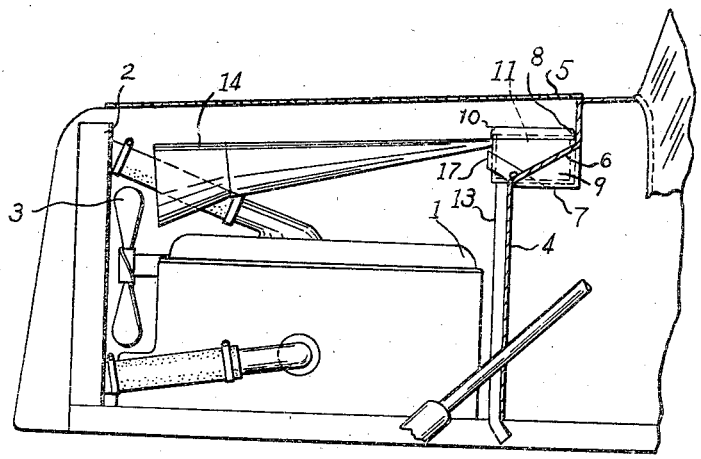
Fig. 1
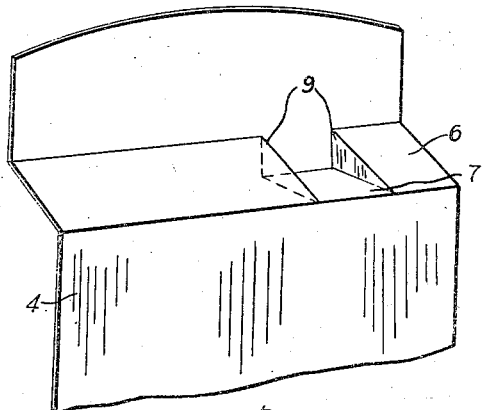
Fig. 3
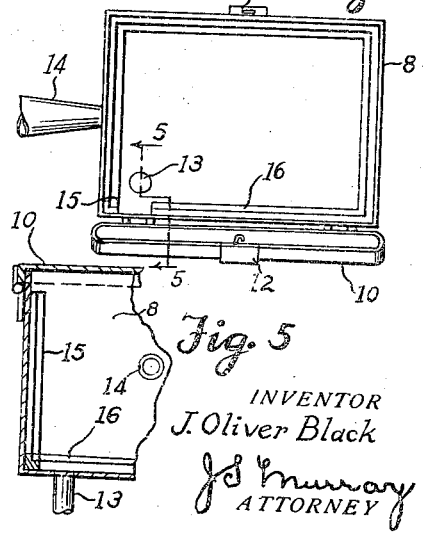
Fig. 4
Fig. 5
INVENTOR
J. Oliver Black
J S Murray
ATTORNEY Patented Feb. 1, 1938

2,106,883

UNITED STATES PATENT OFFICE 2,106,883

BATTERY INSTALLATION FOR MOTOR VEHICLES

John Oliver Black, Detroit, Mich., assignor to The American Forging and Socket Company, Pontiac, Mich., a corporation of Michigan Application April 8, 1936, Serial No. 73,340

3 Claims. (Cl. 180—68.5)

This invention relates to battery installations on motor vehicles and particularly to installation of a battery beneath the hood of such a vehicle.

Disposal of the battery of a motor vehicle beneath the hood thereof is highly desirable from the standpoint of convenient access, but such disposal has heretofore been impractical because of the considerable heat generated by the motor. Heating of a storage battery reduces its efficiency, expedites deterioration and is likely to generate highly objectionable fumes.

An object of the invention is to locate the battery for convenient access beneath the motor hood, while preventing undue heating of the battery by setting up a continuous forced circulation of air in close proximity thereto.

Another object is to utilize the radiator-cooling fan to maintain a cooling flow of air through a space formed between the battery and a container therefor.

A further object is to so fashion the dash of a motor vehicle that it will form a seat and a pair of retaining walls for the battery.

These and various other objects the invention attains by the construction hereinafter described and illustrated in the accompanying drawing, wherein:

Fig. 1 is a view in sectional elevation of the front end portion of a motor vehicle showing installation of a battery in accordance with the invention.

Fig. 2 is a top plan view of the same, the rear portion of the hood being broken away.

Fig. 3 is a perspective view of a motor vehicle dash as fashioned to provide a seat for the vehicle battery.

Fig. 4 is a top plan view of the battery box with its cover raised.

Fig. 5 is a sectional elevational view thereof, taken on the line 5—5 of Fig. 4.

In these views, the reference character 1 designates a vehicle motor, 2 the corresponding radiator, 3 the fan cooling such radiator, 4 the dash, and 5 the hood. Some distance below its top, the dash has a laterally elongated area 6 offset rearwardly at a slight upward inclination and extending fully across and strongly reinforcing the dash.

At any desired point, the area 6 is depressed to form a substantially horizontal seat 7 for a battery box 8 and to further form a pair of substantially vertical triangular walls 9 for laterally positioning said box. The latter is equipped with a cover 10 hinged to afford ready access to the battery 11 and is preferably also equipped with a latch or lock 12 for said cover.

For venting air from the box 8 and any fumes that may abnormally be generated by the battery or liquid that may escape therefrom, a duct 13, preferably rubber, extends downwardly from the box adjacent to the dash, discharging beneath the vehicle.

For delivering a stream of cooling air to the box, an elongated, funnel-shaped, bell-mouthed duct 14 extends forwardly from the box above the motor 1 and opens in rearward proximity to the fan 3. When the latter is operating, a considerable current of air is delivered by the duct 14 to the box 8, flowing therethrough in cooling proximity to the battery, and discharging by way of the duct 13.

Within the box 8 provision is made for spacing the battery from the walls and bottom of the box for air flow purposes. This is accomplished preferably by extending a strip 15 of rubber or other suitable material upwardly from the bottom, in the angle formed by two of the walls, and extending a horizontal strip 16 in the angles formed between the walls and bottom of the box, the strip 16 having one end meeting the strip 15 and the other spaced therefrom. Said strips are of angular cross-section, so as to form an elongated seat for the battery midway between their top and bottom edges. In addition to forming the desired air circulation spaces, said strips baffle the incoming air, so as to prohibit its direct flow to the outlet.

The box 8 may be retained in position on the seat 7 in any desired manner, as for example by freely embracing its front portion by a U-shaped sheet metal strap 17 riveted or otherwise rigidly secured to the area 6 of the dash.

In its described location, the battery is readily accessible for replenishment of water, inspection, or repairs and this access is had without the disturbance of car occupants entailed by present day installations.

The described cooling provision will quite positively prevent appreciable heating of the battery by the motor.

A further highly desirable advantage of the described location is the resultant shortening of the heavy cables leading from the battery to the generator, and the increased accessibility of such cables for purposes of original installation, inspection, and replacement.

The invention is presented as including all such modifications and changes as come within the scope of the following claims.

What I claim is:

1. In a battery installation, the combination with a battery and a box receiving the battery and having an inlet in a wall thereof for cooling air and an outlet therefor in its bottom, of a strip substantially encircling the interior of the box at the junctures of its walls and bottom, and spacing the battery from the walls and bottom, said strip having a break therein defining a passage through which air may pass to the space beneath the battery and thence to the outlet, a strip extending upwardly from said first-mentioned strip and located between the break and the inlet, whereby said strips jointly baffle the air to prevent its direct flow from the inlet to the outlet.

2. In a battery installation, the combination with a battery box having an inlet and an outlet for a coolant, of common spacing and baffling means within said box for holding a battery from both the walls and the bottom of the box, and means extending upwardly from a point near the bottom of the box and compelling coolant flowing from the inlet to the outlet to pass over the top portion of a battery within the box.

3. A battery installation as set forth in claim 2 in which said common spacing and baffling means comprises an elongated angular element having portions extending substantially parallel both to the bottom and the side walls of said box.

JOHN OLIVER BLACK.